United States Patent
Johri et al.

(10) Patent No.: US 9,946,926 B2
(45) Date of Patent: *Apr. 17, 2018

(54) SYSTEMS AND METHODS FOR IMAGE RECOGNITION NORMALIZATION AND CALIBRATION

(71) Applicant: Facebook, Inc., Menlo Park, CA (US)

(72) Inventors: Nikhil Johri, Mountain View, CA (US); Balamanohar Paluri, Menlo Park, CA (US); Lubomir Bourdev, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,928

(22) Filed: Jul. 7, 2017

(65) Prior Publication Data

US 2017/0308747 A1    Oct. 26, 2017

Related U.S. Application Data

(63) Continuation of application No. 14/983,385, filed on Dec. 29, 2015.

(51) Int. Cl.
*G06K 9/00* (2006.01)
*G06K 9/62* (2006.01)

(52) U.S. Cl.
CPC ..... *G06K 9/00536* (2013.01); *G06K 9/00288* (2013.01); *G06K 9/623* (2013.01); *G06K 9/6253* (2013.01); *G06K 9/6293* (2013.01)

(58) Field of Classification Search
USPC ................................. 382/224–228
See application file for complete search history.

(56) References Cited

U.S. PATENT DOCUMENTS

| | | | |
|---|---|---|---|
| 8,620,842 B1 | 12/2013 | Cormack | |
| 2002/0002483 A1 | 1/2002 | Siegel | |
| 2003/0099395 A1* | 5/2003 | Wang | G06K 9/00248 382/165 |
| 2012/0296920 A1* | 11/2012 | Sahni | H04L 67/22 707/749 |
| 2013/0254184 A1* | 9/2013 | Ellsworth | G06F 17/30038 707/722 |

* cited by examiner

*Primary Examiner* — Alex Liew
(74) *Attorney, Agent, or Firm* — Sheppard Mullin Richter & Hampton LLP

(57) ABSTRACT

Systems, methods, and non-transitory computer-readable media can calculate raw scores for a plurality of media items based on a classifier model and a target concept. The plurality of media items are ranked based on the raw scores. A review set of the plurality of media items is determined, the review set comprising a subset of the plurality of media items. Each of the media items of the review set is associated with a content depiction determination. A normalized score formula is calculated based on the raw scores and the content depiction determinations for the media items of the review set.

20 Claims, 7 Drawing Sheets

SYSTEMS AND METHODS FOR IMAGE RECOGNITION NORMALIZATION AND CALIBRATION

CROSS-REFERENCE TO RELATED APPLICATIONS

This application is a continuation of U.S. patent application Ser. No. 14/983,385, filed on Dec. 29, 2015 and entitled "SYSTEMS AND METHODS FOR IMAGE RECOGNITION NORMALIZATION AND CALIBRATION", which is incorporated herein by reference in its entirety.

FIELD OF THE INVENTION

The present technology relates to the field of social networks. More particularly, the present technology relates to image recognition normalization and calibration.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Media items posted to the social networking system can be processed and analyzed. Processing and analysis of media items can be performed to provide additional features and services for users. For example, facial recognition can be used to suggest users to be tagged in photos or videos. Media items can also be processed and analyzed to provide useful information for the social networking system. For example, information that can be automatically pulled from images or videos posted to the social networking system can provide useful information about user trends, popular subjects, and the like. Such information can be utilized by the social networking system to improve products and services offered to users.

SUMMARY

Various embodiments of the present disclosure can include systems, methods, and non-transitory computer readable media configured to calculate raw scores for a plurality of media items based on a classifier model and a target concept. The plurality of media items are ranked based on the raw scores. A review set of the plurality of media items is determined, the review set comprising a subset of the plurality of media items. Each of the media items of the review set is associated with a content depiction determination. A normalized score formula is calculated based on the raw scores and the content depiction determinations for the media items of the review set.

In an embodiment, the review set is determined based on a sampling rate.

In an embodiment, a sampling rate selection is received from a user.

In an embodiment, calculating the normalized score formula comprises calculating a logistic regression formula based on the raw scores and the content depiction determinations for the media items of the review set.

In an embodiment, a user interface configured to receive content depiction determinations for the media items of the review set is presented.

In an embodiment, the classifier model is re-trained based on the normalized score formula.

In an embodiment, the method is repeated with the re-trained classifier model.

In an embodiment, the normalized score formula is configured to convert a raw score calculated by the classifier model into a normalized score.

In an embodiment, the normalized score is a probability value.

In an embodiment, the review set comprises a fixed number of media items.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
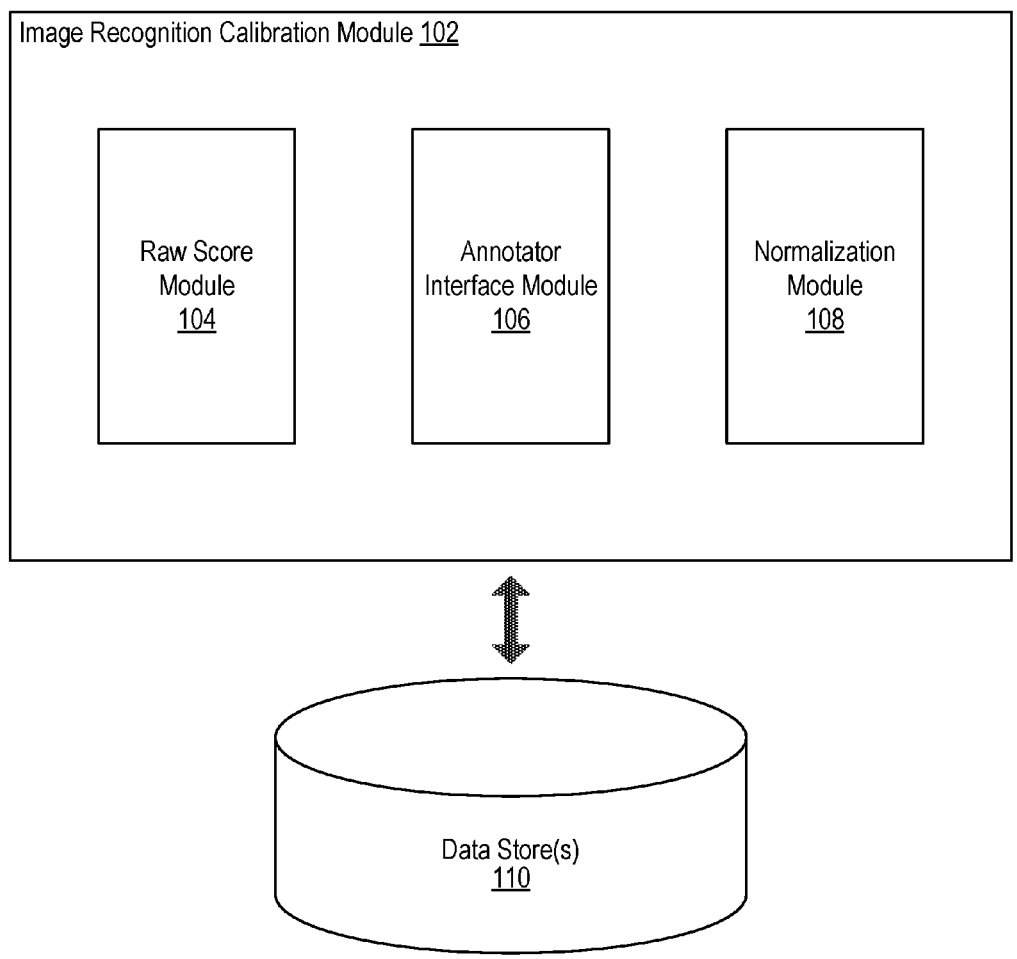
FIG. 1 illustrates an example system including an image recognition calibration module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Social Network Image Recognition Calibration

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

Media items posted to the social networking system can be processed and analyzed. Processing and analysis of media items can be performed to provide additional features and services for users. For example, facial recognition can be used to suggest users to be tagged in photos or videos. Media items can also be processed and analyzed to provide useful information for the social networking system. For example, information that can be automatically pulled from images or videos posted to the social networking system can provide useful information about user trends, popular subjects, and the like. Such information can be utilized by the social networking system to improve products and services offered to users.

It continues to be an important interest for a social networking system to develop systems and procedures for effectively and efficiently analyzing media items posted to the social networking system. Consistent with this interest, social networking systems can utilize image recognition systems to analyze media items posted by users to the social networking system. However, current image recognition systems suffer from various drawbacks. Image recognition systems that are trained to distinguish between numerous different concepts, sometimes thousands of concepts, can be extremely complex. When image recognition systems are designed to distinguish between numerous concepts, the system must be capable of comparing analyses across those numerous concepts to determine which concepts likely appear in a media item. However, current image recognition systems suffer from the drawback of analyses of different concepts yielding results that are not directly comparable to each other. For example, if a system is designed to assign a raw score indicative of the likelihood of a particular concept appearing in a piece of media, a particular raw score for a first concept may not be equivalent to the same raw score for a second concept. This can occur, for example, because the first concept is more easily distinguishable from other concepts than the second, or the first concept may appear more often with other concepts, while the second concept often appears on its own.

An improved approach rooted in computer technology overcomes the foregoing and other disadvantages associated with conventional approaches specifically arising in the realm of computer technology. Based on computer technology, the disclosed technology can determine raw scores for a plurality of media items based on a classifier model. The classifier model can be configured to output one or more raw scores, each raw score indicative of the likelihood of a media item depicting a particular target concept. For a target concept, the plurality of media items can be ranked based on raw score for the target concept. An annotator can be provided with a user interface for viewing a subset of the ranked media items, and for adjusting the sampling rate of the subset of ranked media items. The user interface can also allow the annotator to mark which media items depict the target concept and which do not, resulting in a binary "yes" or "no" concept depiction determination for each media item. Each media item's raw score and the concept depiction determination can be provided to a logistic regression model to calculate a normalized score function. The normalized score function can be used to convert from raw scores to normalized scores. By going through this normalization process, raw scores for various concepts can be converted to a normalized score on a normalized scale that can be compared across concepts. The normalized score, in various embodiments, can be a probability score indicative of the probability of a concept being contained in a media item.

FIG. 1 illustrates an example system 100 including an example image recognition calibration module 102 configured to normalize image recognition raw scores across various concepts, according to an embodiment of the present disclosure. The image recognition calibration module 102 can be configured to analyze media items using a classifier model. The classifier model can be trained to analyze a media item to determine the likelihood that the media item depicts one or more concepts. For example, the classifier model can be trained to analyze an image or a video and to perform image recognition to determine what is depicted in the image or video. For a particular media item, the classifier model can output a raw score for each of a plurality of different concepts, indicative of the likelihood that each concept is depicted in the media item. In a simplified example, the classifier model can be trained to look for people, dogs, cars, and cows. For each media item, the classifier model can review the media item, e.g., an image, and output a raw score for the concept "people," indicative of how likely it is that there are one or more people in the image based on image analysis, and a separate raw score of the concept "dogs," indicative of how likely it is that there are one or more dogs in the image, and so forth. For a given target concept, the image recognition calibration model 102 can be calibrated to rank a set of media items based on the raw scores of those media items for the target concept. For example, given a target concept "cow," a set of one million images can be ranked based on the raw score of each image on the concept "cow." The image recognition calibration module 102 can be configured to present a user interface for an annotator that displays a subset of the ranked images, i.e., a review set. The user interface can be configured to allow the annotator to select the review set, e.g., by selecting a sampling rate. In certain embodiments, the subset is selected such that approximately half the media items in the review set depict the target concept, e.g., depict a cow, and approximately half the media items in the review set do not depict the target concept. The annotator can mark each media item in the review set with a binary concept depiction determination indicative of whether or not the media item depicts the target concept. The raw score of each media item in the review set can be paired with the media item's concept depiction determination and then fed into a logistic regression model. The logistic regression model results in a normalized score formula that can be used to convert raw scores into normalized scores. Normalized scores allow for comparison of probabilities of depiction across various concepts, even if the raw scores of those concepts are not directly comparable.

As shown in the example of FIG. 1, the image recognition calibration module 102 can include a raw score module 104, an annotator interface module 106, and a normalization module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The raw score module 104 can be configured to calculate raw scores for a plurality of media items based on a classifier model and a target concept. As discussed above, the classifier model can be trained to analyze a media item for one or more different concepts, e.g., to look for a "person" or a "car" or a "cow" based on various visual features of each concept. The classifier model, for a given media item and a given concept, can output a raw score indicative of the likelihood that the media item depicts the given concept. Each media item can be associated with a plurality of different raw scores, one for each concept embodied in the classifier model. However, it is possible for a classifier model to embody thousands of different concepts. In order to save storage space, the number of raw scores associated with a media item can be limited to a number smaller than the number of concepts embodied in the classifier model. For example, each media item can be associated with twenty raw scores, even if the classifier model is trained to analyze for thousands of different concepts. Associating thousands of raw scores with each media item could take up an inordinate amount of storage space, when simply saving the top ten or top twenty raw scores for each media item likely captures the concepts that are actually depicted in the media item. A plurality of media items can be provided to a classifier model, and the classifier model can analyze each media item to determine a raw score indicative of the likelihood that the media item depicts a target concept. The plurality of media items can be ranked based on raw scores.

The annotator interface module 106 can be configured to provide a user interface for a user, e.g., an annotator. The user interface can be configured to present a subset of media items from the ranked plurality of media items provided by the raw score module 104, i.e., a review set. The review set can include a fixed number of media items. For example, the plurality of media items analyzed by the raw score module 104 can include a million images, and the annotator interface module 106 can present a review set of one hundred ranked images. The review set can be presented in ranked order based on raw score, e.g., from highest to lowest. The annotator interface can allow the user to select a step size, or sampling rate, to vary the review set while keeping the size of the review set fixed. For example, if review set is configured to include one hundred media items, the user can select a sampling rate of 1 to show the top one hundred ranked media items from the ranked plurality of media items. If the user selects a sampling rate of 5, then the user interface can display every fifth media item, such that the review set presented to the user represents a sampled set of one hundred media items from the top five hundred ranked media items.

In certain embodiments, the annotator can select a sampling rate such that approximately one half of the subset comprises media items that depict the target concept, and approximately one half of the subset comprises media items that do not depict the target concept. For example, if the target concept is "cow," the user may be presented, at first, with a review set comprising the top one hundred ranked images for the target concept "cow." Since the top raw scores are indicative of the highest likelihood of depicting a cow, it is possible that every media item in the top one hundred media items depicts a cow. This is not particularly ideal for the logistic regression normalization, described in greater detail below. It is more desirable to have a review set that is approximately one half positive (i.e., depict a cow), and approximately one half negative (i.e., do not depict a cow). The user can increase the step size to three, such that the review set includes one hundred media items evenly sampled from the top three hundred ranked media items. Since the top three hundred ranked media items are now represented in the review set, whereas previously only the top one hundred were, it is possible that towards the bottom of the ranked review set, images begin to appear to that do not depict a cow. The user can continue to increase the sampling rate until approximately half the media items in the review set depict a cow, and approximately half do not depict a cow.

The annotator user interface can also be configured to allow the annotator to mark each media item in the review set with a content depiction determination. The content depiction determination is indicative of whether or not the media item depicts the target concept. In certain embodiments, the content depiction determination can be binary, e.g., "yes" the media item depicts the target concept, or "no" the media item does not depict the target concept. In certain embodiments, rather than a binary "yes" or "no", the content depiction determination can include a third option indicating that the annotator is unsure of whether or not the target concept is depicted. The annotator interface module 106 is discussed in greater detail herein.

The normalization module 108 can be configured to receive the raw score and the content depiction determination for each media item in the review set from the annotator interface module 106, and to determine normalized scores based on the collective raw scores and content depiction determinations of the review set. In various embodiments, the normalization module 108 can use the raw scores and the content depiction determinations of the review set to determine a normalized score formula that can be used to convert a raw score into a normalized score. For example, if the content depiction determination is binary, each "yes" determination can be marked as a 1, and each "no" determination can be marked as a 0, and each raw score, content depiction determination pairing can be provided to a logistic regression model as an ordered pair. If the content depiction determination has the option of marking "unsure," then each yes can be marked as a 1, each no as a −1, and each "unsure" as a 0. Again, each media item's content depiction determination can be paired with the media item's raw score as an ordered pair. If there are one hundred media items in the review set, then they yield one hundred ordered pairs to feed into a logistic regression model to determine a normalized score formula, e.g., $F(x)=1/(1+e^{\wedge}(-\beta_0\beta_1 x))$, where $F(x)$ is a normalized score, and x is a raw score. The ordered pairs can be used to calculate $\beta_0$ and $\beta_1$ that best fit the data. The normalized score formula can be utilized to translate from a raw score for the target category to a normalized score. In certain embodiments, the normalized score can represent a probability score between 0 and 1, indicative of the probability that a target concept is depicted in a media item.

Normalized scores can be compared between different concepts to determine which concept is more likely to be depicted in a media item. For example, if a particular media item has a raw score of 14 for a first concept, e.g., "dog,", and a 25 for a second concept, e.g., "cow," those two raw scores may not be directly comparable to determine which is more likely depicted in the media item. This may be because the models for calculating the raw scores for these two concepts vary, or any other reason. However, if a normalized score formula is calculated for the "dog" concept, and a normalized score formula is calculated for the "cow" concept, then the raw scores can be converted into normalized scores, e.g., probability values, and the normalized scores can be compared to one another to determine whether the media item more likely depicts a cow or more likely depicts a dog, or the likelihood that the media item includes depictions of both, or neither.

In certain embodiments, normalized score formulas can be used to improve and re-calibrate the classifier model. The processes described herein can be repeated several times or performed iteratively to improve the classifier model's training for a given concept. For example, the classifier model can be trained to initially output a raw score for a target concept ranging from −20 to 20. The raw scores can be used to review a review set, and to create raw score and concept depiction determination ordered pairs, that are used to create a first normalized score formula that yields normalized scores for the target concept. The classifier model can be revised based on the first normalized score formula so that the raw scores it outputs are now the normalized scores from the first normalized score formula. The steps can then be repeated using the newly trained classifier model. Another set of media items can be analyzed using the newly trained classifier model, which outputs raw scores, which are the normalized scores from the first normalized score formula. A new review set can be generated, and each media item in the review set tagged with a content depiction determination. The new ordered pairs of raw scores (which are normalized scores from the first normalized score formula) and concept depiction determinations can be fed into a logistic regression model to calculate a second normalized score formula, and the classifier model can once again be updated. This process can be repeated, with each iteration resulting in a normalized score formula that is more accurate and reliable. In this way, in addition to normalization for comparison across various concepts, the presently disclosed technology can be utilized to calibrate a classifier model. In certain embodiments, a target concept for calibration can be selected based on target concept selection criteria. For example, the target concept may yield strange data that indicate that the target concept is not well calibrated. More particularly, consider the example of a social networking system in which the classifier model indicates that 50% of all media items posted to the social networking system depict an SUV. This is highly unlikely to be true, and it may indicate that the target criteria "SUV" needs to be recalibrated.

In certain embodiments, a minimum normalized score threshold can be used as a filter. For example, if it is determined that any media images with a normalized score below a particular score are substantially certain not to depict a target concept, then the particular score can be set as the minimum normalized score threshold. Any media items that do not satisfy the minimum normalized score threshold can be definitively labeled or removed as not depicting the target concept.

The image recognition calibration module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the image recognition calibration module 102 can be implemented, in part or in whole, as software running on one or more computing devices or systems, such as on a server computing system or a user (or client) computing system. For example, the image recognition calibration module 102 or at least a portion thereof can be implemented as or within an application (e.g., app), a program, or an applet, etc., running on a user computing device or a client computing system, such as the user device 610 of FIG. 6. In another example, the image recognition calibration module 102 or at least a portion thereof can be implemented using one or more computing devices or systems that include one or more servers, such as network servers or cloud servers. In some instances, the image recognition calibration module 102 can, in part or in whole, be implemented within or configured to operate in conjunction with a social networking system (or service), such as the social networking system 630 of FIG. 6. It should be understood that there can be many variations or other possibilities.

The image recognition calibration module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the image recognition calibration module 102. For example, the data store 110 can store one or more classifier models, media image—raw score associations, ranked lists of media images for various concepts, normalized score formulas, and the like. It is contemplated that there can be many variations or other possibilities.

Figure 2:
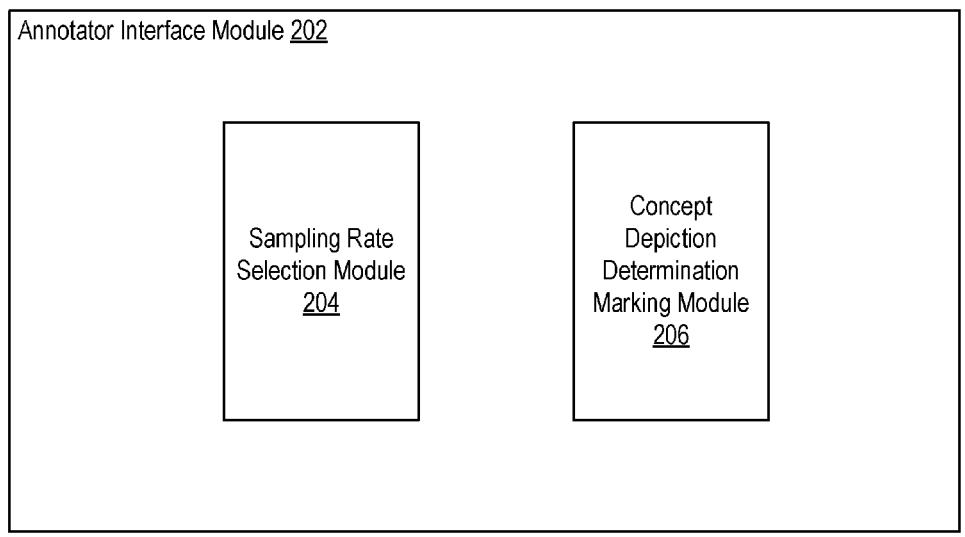
FIG. 2 illustrates an example annotator interface module, according to an embodiment of the present disclosure.

FIG. 2 illustrates an example annotator interface module 202 configured to provide a user interface for annotators reviewing media items, according to an embodiment of the present disclosure. In some embodiments, the annotator interface module 106 of FIG. 1 can be implemented as the example annotator interface module 202. As shown in FIG. 2, the annotator interface module 202 can include a sampling rate selection module 204, and a concept depiction determination marking module 206.

The sampling rate selection module 204 can be configured to allow the annotator to select a sampling rate for a review set to be reviewed by the annotator. As discussed above, a classifier model can be utilized to calculate raw scores for a plurality of media items for a target concept. The plurality of media items can be ranked based on raw score. For example, one million images can be analyzed based on the target concept of "cow," and raw scores calculated for each of the one million images, and the one million images can be ranked based on raw score. An annotator can then be presented with a subset of the plurality of media items, i.e., a review set, to review and mark as depicting or not depicting the target concept. For example, of the million images analyzed and ranked, the annotator may be presented with a review set of one hundred images. The review set can comprise a ranked, sampled subset of the plurality of media images with a fixed number of media images. The annotator can vary the sampling rate so as to vary the media items included in the review set. For example, if the review set has a fixed size of one hundred media items, the annotator can select a sampling rate of 1 to view the top one hundred ranked media items from the plurality of media items. If the annotator selects a sampling rate of 5, the annotator can be presented with every fifth image in the top five hundred ranked media items from the plurality of media items, such that the review set is still one hundred media items, but the set of media items in the review set is different than if the sampling rate was set to 1. In certain embodiments, a sampling rate can be suggested to the annotator. For example, a sampling rate can be suggested based on the sampling rate selected for the same target criteria by a previous annotator. In various embodiments, the annotator can vary the sampling rate until approximately one half of the media items in the review set depict the target concept, and approximately one half of the media items in the review set do not depict the target concept. By ensuring that there is an approximately equal number of media items that depict the target concept and do not depict the target concept, ensures some diversity in the ordered pairs provided to the logistic regression model, which improves the chances that the logistic regression model will yield an accurate and reliable normalized score function.

The concept depiction determination module 206 can be configured to present a review set of media items to an annotator and to allow the annotator to mark each media item in the review set with a concept depiction determination. As discussed above, in certain embodiments the concept depiction determination can be a binary determination, e.g., "yes" the target concept is depicted, or "no" the target concept is not depicted. In various embodiments, the concept depiction determination may include a third option to allow the annotator to state that he or she is unsure as to whether or not the target concept is depicted.

Figure 3:
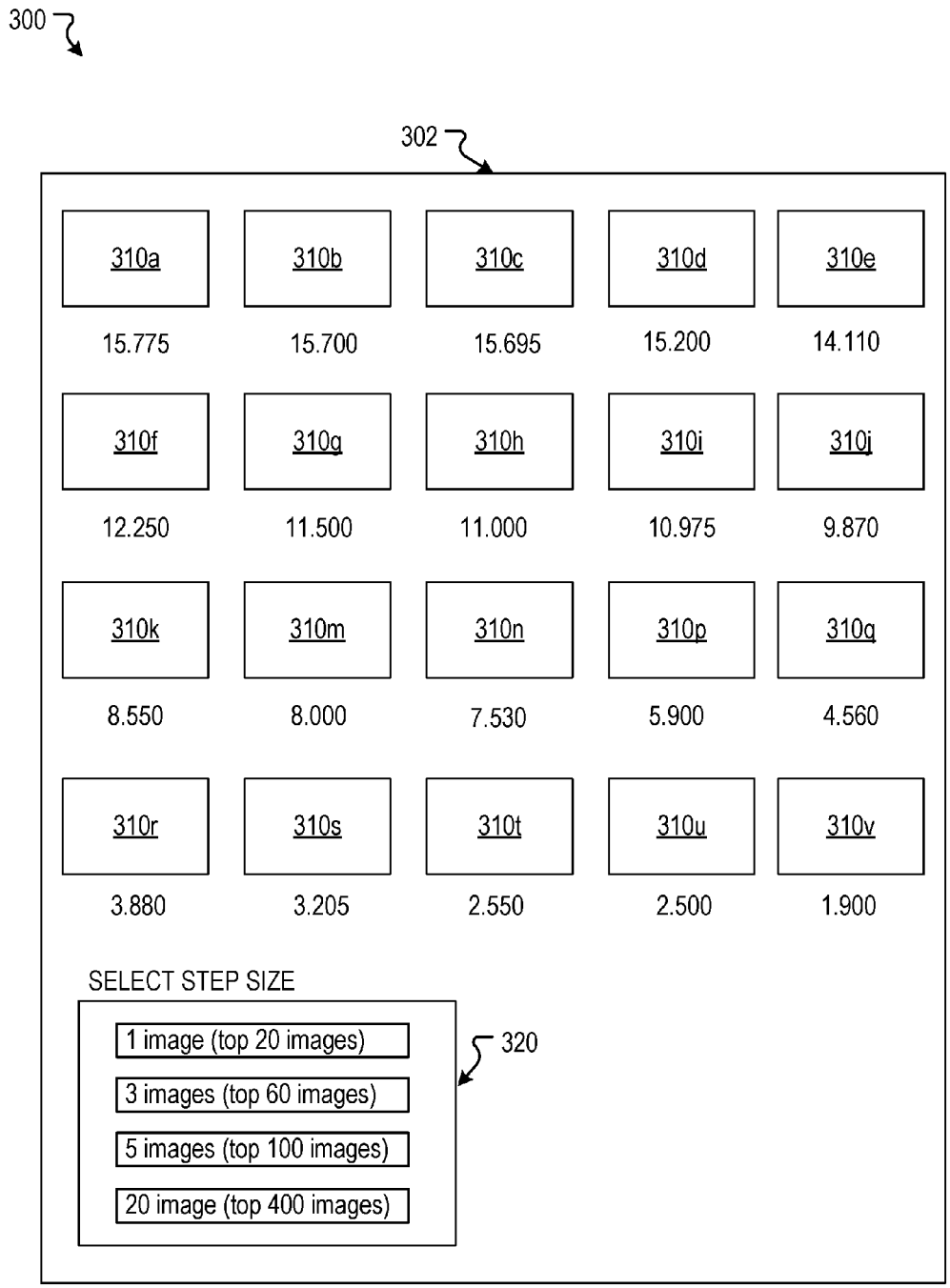
FIG. 3 illustrates an example scenario including an example annotator interface, according to an embodiment of the present disclosure.

FIG. 3 illustrates an example scenario 300 including an example annotator interface 302, according to an embodiment of the present disclosure. The example annotator interface 302 displays a review set of twenty media items 310*a-v*. Immediately below each media item is a raw score calculated by a classifier model. A sampling rate selection module 320 allows the annotator to select a sampling rate, e.g., every 1 image, every 3 images, every 5 images, every 20 images, etc. As the user selects different sampling rates, the media items shown in the interface 302 change. For example, if the user selects the "1 image" sampling rate, then media item 310*a* would show the first item of a ranked list of media items, and media item 310*b* would show the second item of the ranked list of media items, and media item 310*c* the third item, and so on. However, if the user selects the "3 images" sampling rate, then the media item 310*a* would still be the same first item of the ranked list of media items, but media item 310*b* would be the fourth item in the ranked list of media items, and media item 310*c* would be the seventh item in the ranked list of media items, and so forth. The annotator can then mark each item as depicting a target concept, or not depicting the target concept. For example, by selecting a media item, the annotator can indicate that the selected media item depicts the target concept. Conversely, by unselecting a media item or leaving a media item unselected, the annotator can indicate that the media item does not depict the target concept. In certain embodiments, the annotator can also be provided with the option of marking that he or she is unsure as to whether or not the media item depicts the target concept.

Figure 4:
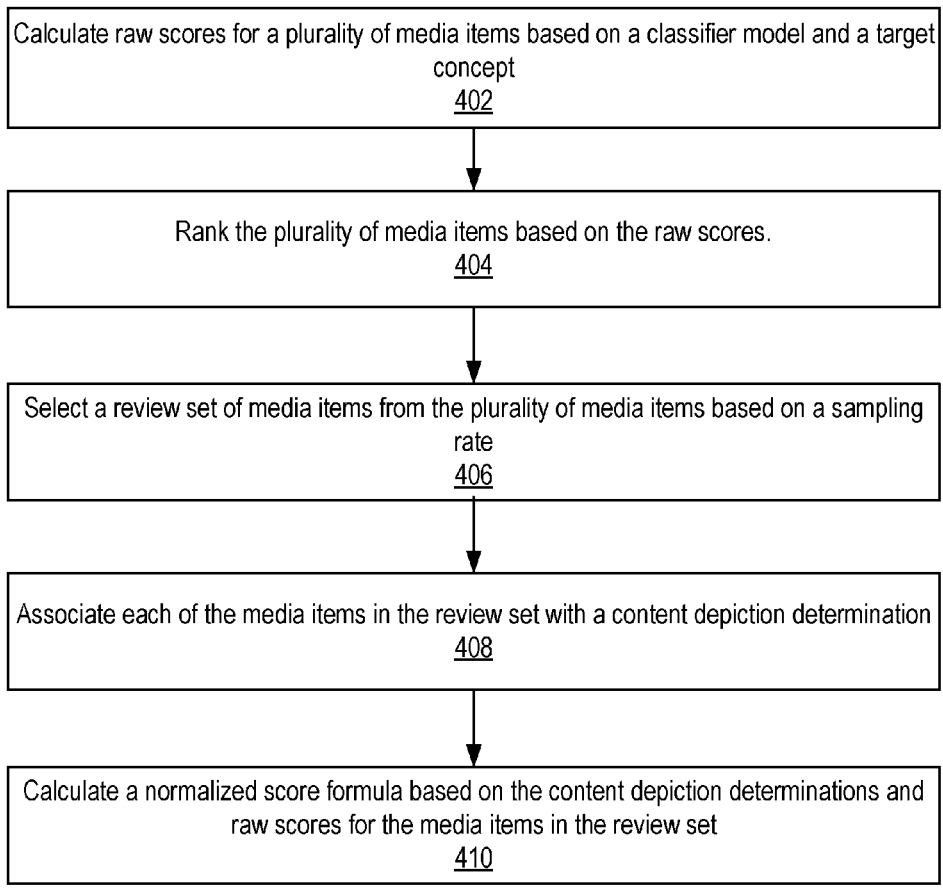
FIG. 4 illustrates an example method for normalizing scores of a classifier model, according to an embodiment of the present disclosure.

FIG. 4 illustrates an example method 400 associated with normalizing scores of a classifier model, according to an embodiment of the present disclosure. It should be appreciated that there can be additional, fewer, or alternative steps performed in similar or alternative orders, or in parallel, based on the various features and embodiments discussed herein unless otherwise stated.

At block 402, the example method 400 can calculate raw scores for a plurality of media items based on a classifier model and a target concept. At block 404, the example method 400 can rank the plurality of media items based on the raw scores. At block 406, the example method 400 can select a review set of media items from the plurality of media items based on a sampling rate. At block 408, the example method 400 can associate each of the media items in the review set with a content depiction determination. At block 410, the example method 400 can calculate a normalized score formula based on the content depiction determinations and raw scores for the media items in the review set. Other suitable techniques that incorporate various features and embodiments of the present technology are possible.

Figure 5:
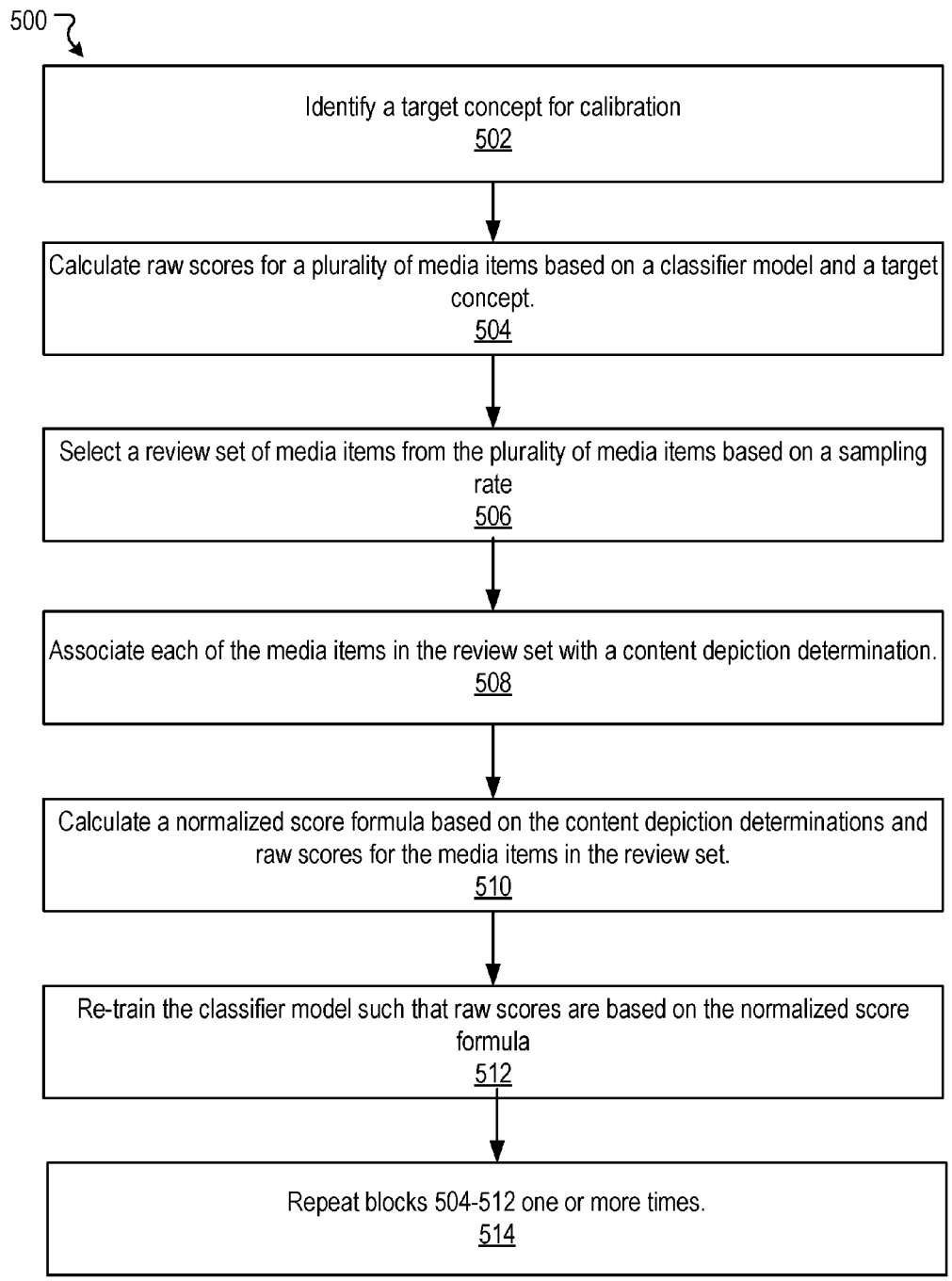
FIG. 5 illustrates an example method for calibrating a target concept of a classifier model, according to an embodiment of the present disclosure.

FIG. 5 illustrates an example method 500 associated with calibrating a target concept based on repeated normalizations of the target concept, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can determine an application feature causing a social networking application to crash. At block 504, the example method 500 identify a target concept for calibration. At block 506, the example method 500 can select a review set of media items from the plurality of media items based on a sampling rate. At block 508, the example method 500 can associate each of the media items in the review set with a content depiction determination. At block 510, the example method 500 can calculate a normalized score formula based on the content depiction determinations and raw scores for the media items in the review set. At block 512, the example method 500 can re-train the classifier model such that raw scores are based on the normalized score formula. At block 514, the example method 500 can repeat block 504-512 one or more times. Other suitable techniques that incorporate various features and embodiments of the present technology are possible.

Social Networking System—Example Implementation

Figure 6:
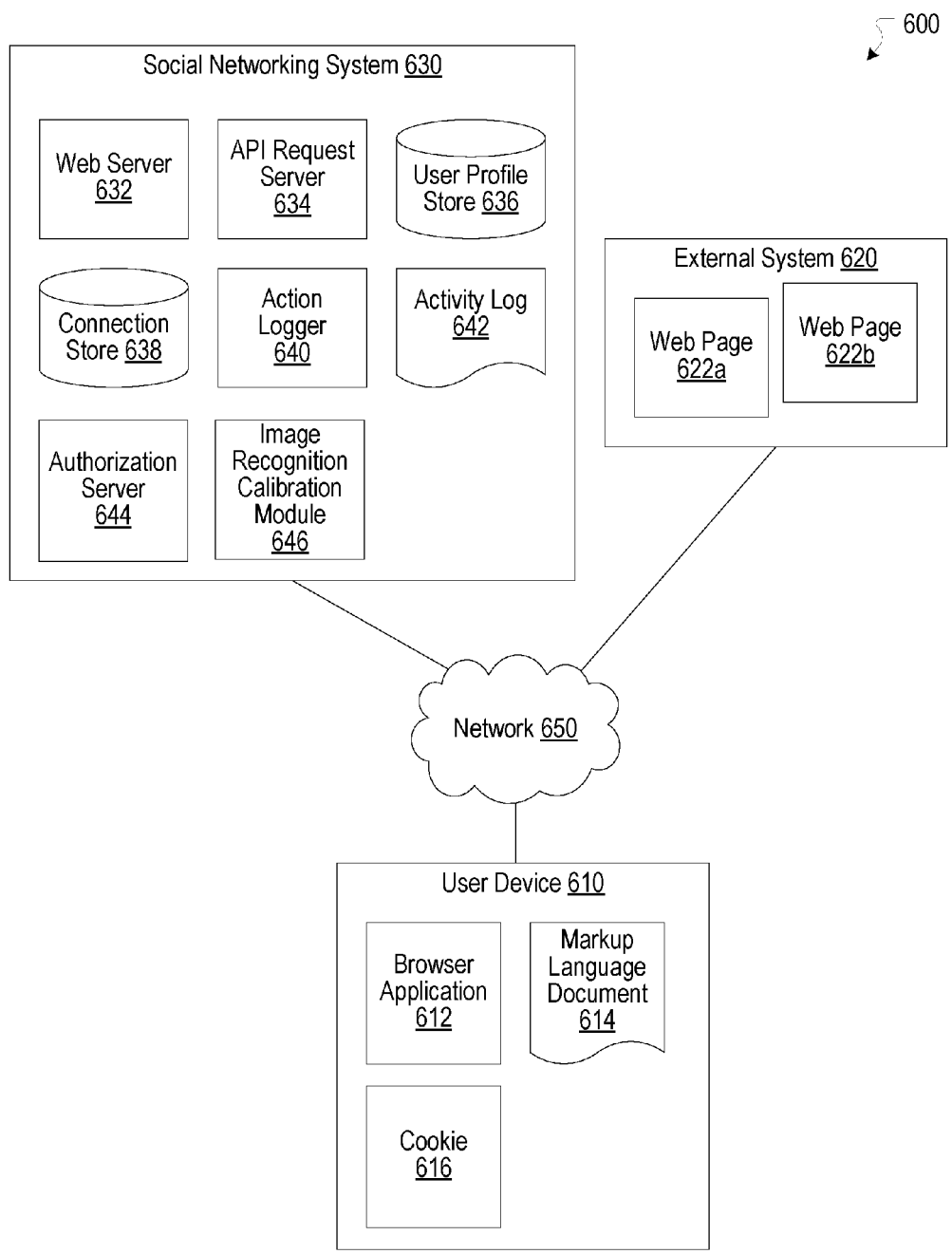
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an image recognition calibration module 646. The image recognition calibration module 646 can, for example, be implemented as the image recognition calibration module 102, as discussed in more detail herein. As discussed previously, it should be appreciated that there can be many variations or other possibilities. For example, in some embodiments, one or more functionalities of the image recognition calibration module 646 can be implemented in the user device 610.

Hardware Implementation

Figure 7:
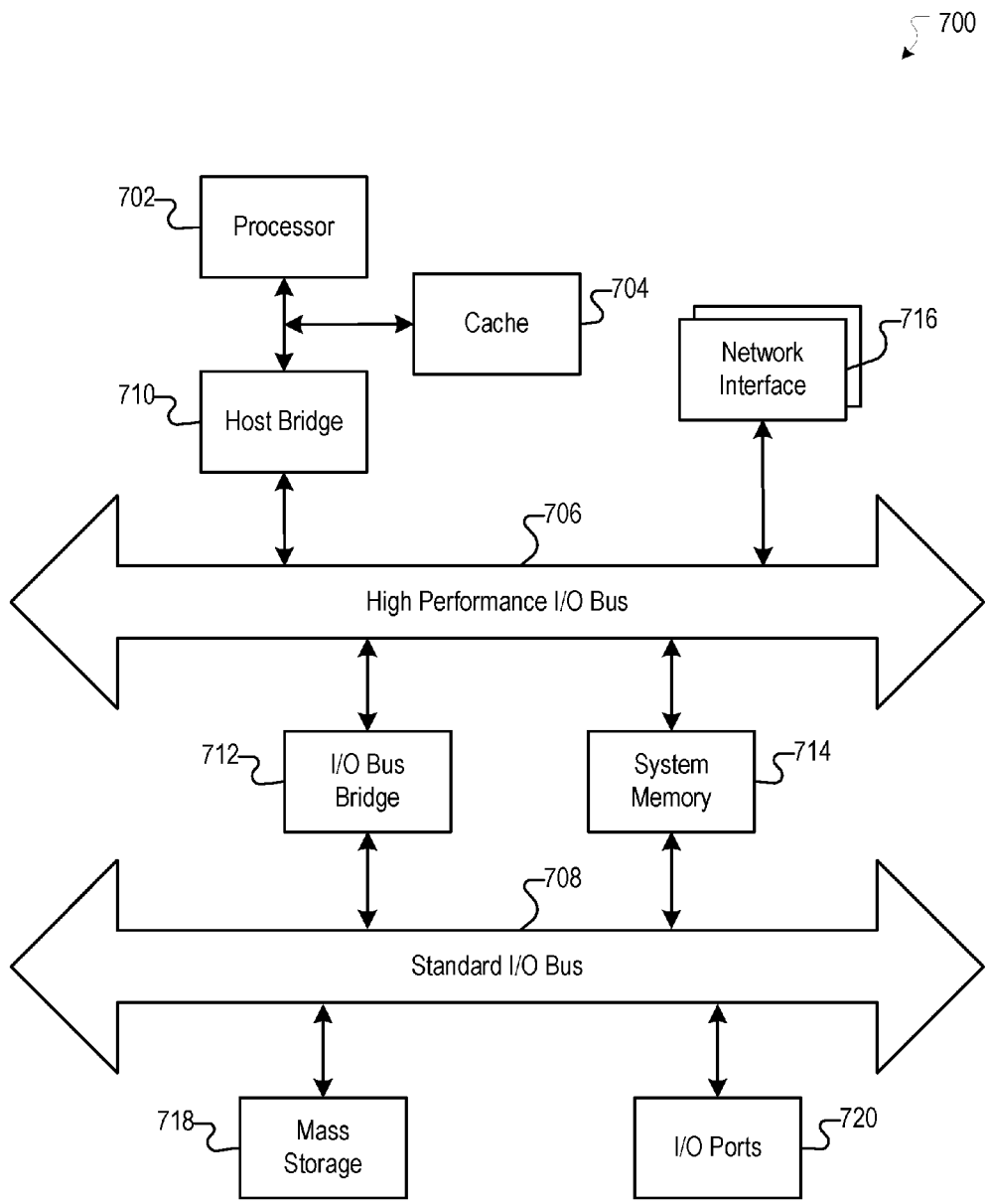
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   calculating, by a computing system, raw scores for a plurality of media items based on a classifier model and a target concept;
   associating, by the computing system, each media item of the plurality of media items with a content depiction determination indicative of whether the media item depicts the target concept; and
   calculating, by the computing system, normalized scores for the plurality of media items based on the raw scores and the content depiction determinations, wherein,
   for each media item of the plurality of media items, the normalized score is associated with the target concept and is indicative of a likelihood that the media item depicts the target concept.

2. The computer-implemented method of claim 1, wherein the calculating normalized scores for the plurality of media items comprises calculating a normalized score formula based on the raw scores and the content depiction determinations.

3. The computer-implemented method of claim 2, wherein the calculating the normalized score formula comprises calculating a logistic regression formula based on the raw scores and the content depiction determinations.

4. The computer-implemented method of claim 2, further comprising re-training the classifier model based on the normalized score formula.

5. The computer-implemented method of claim 4, further comprising repeating the computer-implemented method using the re-trained classifier model.

6. The computer-implemented method of claim 2, wherein the normalized score formula is configured to convert a raw score calculated by the classifier model into a normalized score.

7. The computer-implemented method of claim 2, wherein
   the plurality of media items defines a review subset of a larger set of media items, and
   the method further comprises calculating a normalized score for a first media item based on the normalized score formula, wherein the first media item is contained within the larger set of media items, but not within the review subset.

8. The computer-implemented method of claim 7, wherein the review subset comprises a fixed number of media items.

9. The computer-implemented method of claim 7, wherein the review subset is selected from the larger set based on a sampling rate.

10. The computer-implemented method of claim 1, further comprising presenting a user interface configured to receive content depiction determinations for the plurality of media items.

11. A system comprising:
at least one processor; and
a memory storing instructions that, when executed by the at east one processor, cause the system to perform a method comprising:
calculating raw scores for a plurality of media items based on a classifier model and a target concept;
associating each media item of the plurality of media items with a content depiction determination indicative of whether the media item depicts the target concept; and
calculating normalized scores for the plurality of media items based on the raw scores and the content depiction determinations, wherein,
for each media item of the plurality of media items, the normalized score is associated with the target concept and is indicative of a likelihood that the media item depicts the target concept.

12. The system of claim 11, wherein the calculating normalized scores for the plurality of media items comprises calculating a normalized score formula based on the raw scores and the content depiction determinations.

13. The system of claim 12, wherein the calculating the normalized score formula comprises calculating a logistic regression formula based on the raw scores and the content depiction determinations.

14. The system of claim 12, wherein the method further comprises re-training the classifier model based on the normalized score formula.

15. The system of claim 12, wherein the normalized score formula is configured to convert a raw score calculated by the classifier model into a normalized score.

16. A non-transitory computer-readable storage medium including instructions that, when executed by at least one processor of a computing system, cause the computing system to perform a method comprising:
calculating raw scores for a plurality of media items based on a classifier model and a target concept;
associating each media item of the plurality of media items with a content depiction determination indicative of whether the media item depicts the target concept; and
calculating normalized scores for the plurality of media items based on the raw scores and the content depiction determinations, wherein,
for each media item of the plurality of media items, the normalized score is associated with the target concept and is indicative of a likelihood that the media item depicts the target concept.

17. The non-transitory computer-readable storage medium of claim 16, wherein the calculating normalized scores for the plurality of media items comprises calculating a normalized score formula based on the raw scores and the content depiction determinations.

18. The non-transitory computer-readable storage medium of claim 17, wherein the calculating the normalized score formula comprises calculating a logistic regression formula based on the raw scores and the content depiction determinations.

19. The non-transitory computer-readable storage medium of claim 17, wherein the method further comprises re-training the classifier model based on the normalized score formula.

20. The non-transitory computer-readable storage medium of claim 17, wherein the normalized score formula is configured to convert a raw score calculated by the classifier model into a normalized score.

\* \* \* \* \*